US008064878B2

(12) United States Patent
Lin

(10) Patent No.: US 8,064,878 B2
(45) Date of Patent: Nov. 22, 2011

(54) MOBILE PHONE AND METHOD FOR MANAGING COMMUNICATION FEES THEREOF

(75) Inventor: Chih-Lung Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 434 days.

(21) Appl. No.: 12/465,638

(22) Filed: May 13, 2009

(65) Prior Publication Data

US 2009/0325541 A1    Dec. 31, 2009

(30) Foreign Application Priority Data

Jun. 30, 2008  (CN) .......................... 2008 1 0302420

(51) Int. Cl.
*H04M 11/00* (2006.01)
*H04M 1/00* (2006.01)
*H04M 15/00* (2006.01)

(52) U.S. Cl. ................. 455/407; 455/550.1; 379/112.07; 379/114.01; 379/114.09

(58) Field of Classification Search .......... 455/405–408, 455/550.1, 556.2; 379/111, 112.01, 112.07, 379/114.01, 114.09
See application file for complete search history.

(56) References Cited

U.S. PATENT DOCUMENTS

| 6,532,283 | B1 * | 3/2003 | Ingram ......................... 379/130 |
| 7,221,747 | B2 * | 5/2007 | Hlasny .......................... 379/130 |
| 2005/0089152 | A1 * | 4/2005 | Han .............................. 379/140 |

* cited by examiner

*Primary Examiner* — Michael Thier
(74) *Attorney, Agent, or Firm* — Altis Law Group, Inc.

(57) ABSTRACT

A system and method for managing communication fees of a mobile phone are provided. The system is implemented by the mobile phone, and is used to manage communication fees when a user of the mobile phone uses a mobile communication service. The mobile phone includes at least one processor operable to execute a communication fees management system, and further includes a storage device and a display screen. The system can detect a current call when a user of the mobile phone makes a call, calculate a communication time and a communication fee of the current call, and display the communication time and the communication fee on the display screen at the termination of the current call.

16 Claims, 3 Drawing Sheets

MOBILE PHONE AND METHOD FOR MANAGING COMMUNICATION FEES THEREOF

BACKGROUND

1. Technical Field

Embodiments of the present disclosure relate to providing communication services of mobile phones, and more particularly to a mobile phone and method for managing communication fees of the mobile phone.

2. Description of Related Art

With the continuous development of wireless network technology, it has become common to use mobile communication devices, such as mobile phones or personal data assistants (PDA), which are capable of engaging in wireless communications. A relatively large charge to use mobile communication services is imposed in a user of a mobile phone. For example, large communication fees are often incurred when the user of the mobile phone uses the mobile communication service.

In order to restrict the large communication fees to use the mobile communication service, a communication charge system has been offered. The communication charge system can report communication times at the end of every communication. However, the communication charge system has a disadvantage that it cannot report communication fees to the user at the end of the every communication.

Therefore, there is an improved system and method for managing communication fees to overcome the above-mentioned disadvantages.

DETAILED DESCRIPTION

Figure 1:
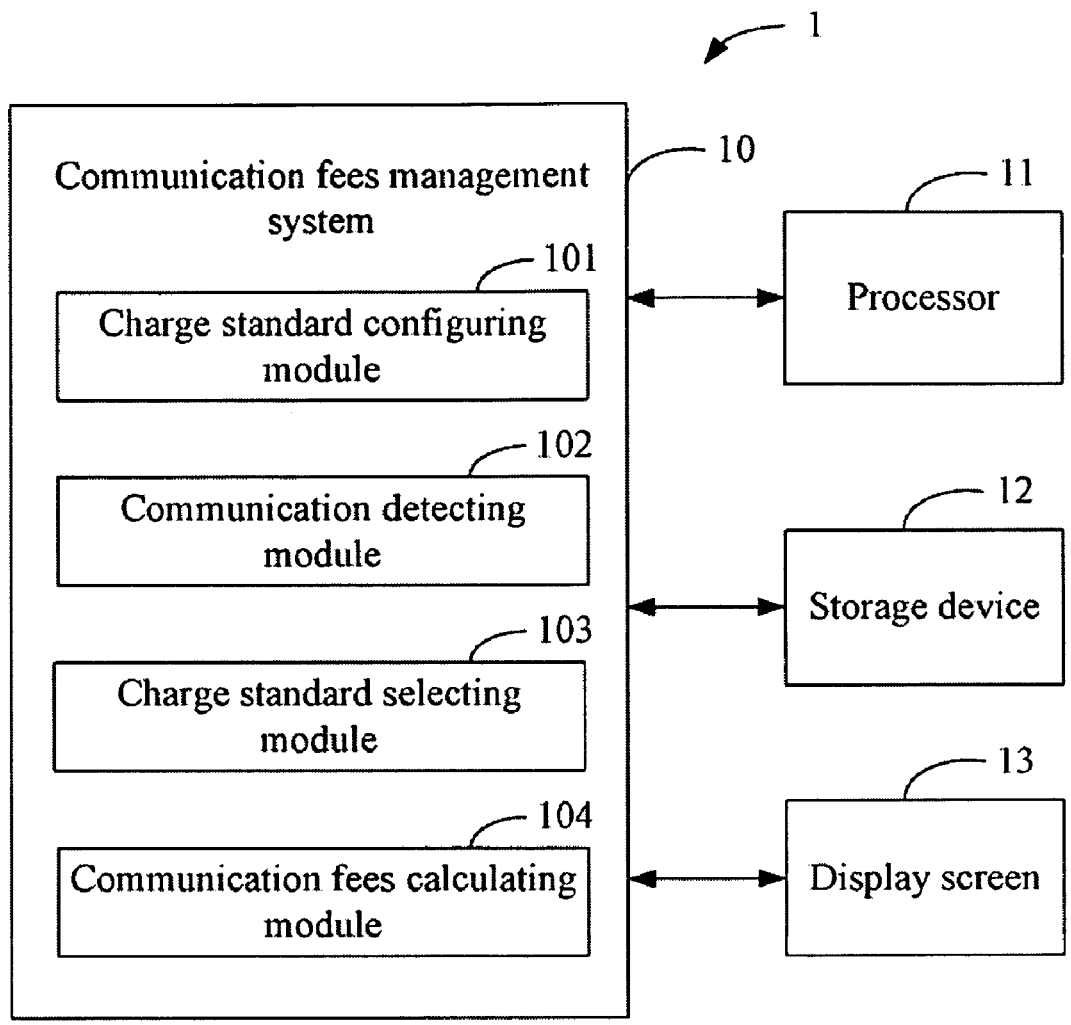
FIG. 1 is a schematic diagram of one embodiment of a mobile phone for managing communication fees.

FIG. 1 is a schematic diagram of one embodiment of a mobile phone 1 for managing communication fees. The mobile phone 1 includes a communication fees management system 10, which is used to manage communication fees when a user of the mobile phone 1 uses mobile communication services. The mobile phone 1 may include at least one processor 11 that executes computerized code for the communication fees management system 10, and may further include a storage device 12 and a display screen 13. In one embodiment, the communication fees management system 10 is included in the storage device 12 or a readable medium of the mobile phone 1. In another embodiment, the communication fees management system 10 may be included in an operating system of the mobile phone 1.

The storage device 12 stores a plurality of charge standards of different telecommunication providers, such as China Mobile, China Unicom, China Telecommunication, for example. Each of the mobile telecommunication providers can provide different communication services to the user of the mobile phone 1 when the user accepts a charge standard of the mobile telecommunication provider. In one embodiment, the storage device 12 may be a smart media card, a secure digital card, a compact flash card, a multi media card, or extreme digital card, and so on.

Figure 3A:
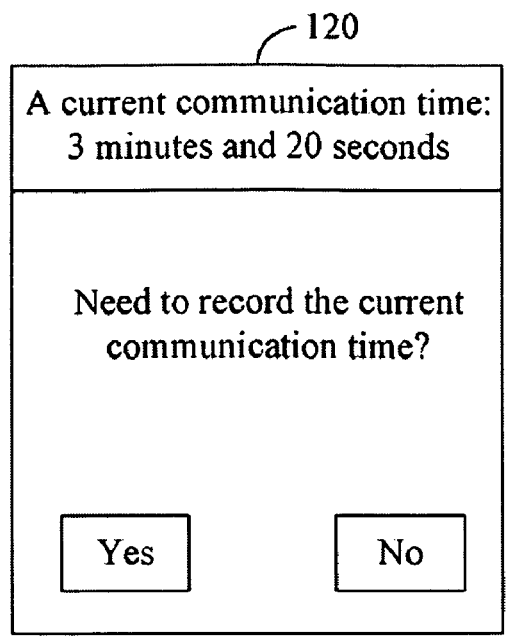
FIG. 3 is a schematic diagram of one embodiment of user interfaces using by the mobile phone of FIG. 1.
Figure 3B:
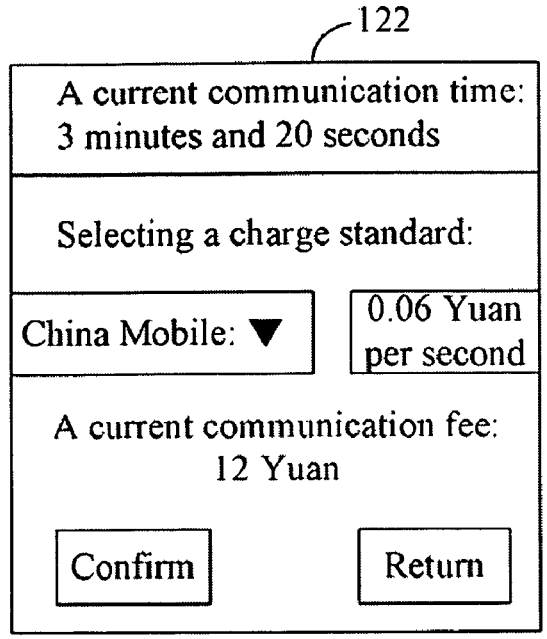

The display screen 13 is operable to display a plurality of user interfaces generated by the communication fees management system 10. Referring to FIG. 3A-3B, the user interfaces may include a communication time reporting interface 120, a charge standard selecting interface 122, and a communication fees reporting interface 124.

The communication fees management system 10 may include a charge standard configuring module 101, a communication detecting module 102, a charge standard selecting module 103, and a communication fees calculating module 104. Each of the function modules 101-104 can be executed by the at least one processor 11 of the mobile phone 1.

The charge standard configuring module 101 is operable to configure a plurality of charge standards of different telecommunication providers in the storage device 12, and store the charge standards into the storage device 12. For example, the user can configure a charge rate as 0.06 Yuan per second according to the charge standard of China Mobile by using the charge standard configuring module 101. Each of the charge standards can be reconfigured when the charge standard of a corresponding telecommunication provider changes.

The communication detecting module 102 is operable to detect a current call when the user of the mobile phone 1 makes a call, and generate the communication time reporting interface 120 on the display screen 13. The communication detecting module 102 is further operable to determine whether the current call needs to be recorded according to an input selection form the communication time reporting interface 120, and record the current communication time into the storage device 12 if the current call needs to be recorded. Referring to FIG. 3A, the communication time reporting interface 120 is generated by the communication detecting module 102 at the end of the current call. In one example, the communication time reporting interface 120 displays that the current communication time is 3 minutes and 20 seconds, and displays a "Yes" or "No" selection to determine whether the current communication time needs to be recorded. If the user selects the "Yes" selection, the communication detecting module 102 determines that the current call needs to be recorded, then records the current communication time into the storage device 12. Otherwise, if the user selects the "No" selection, the communication detecting module 102 determines that the current call does not need to be recorded.

The charge standard selecting module 103 is operable to generate the charge standard selecting interface 122 on the display screen 13, and select a charge standard for the current call according to a destination phone number of the current call. Referring to FIG. 3B, if the destination phone number of the current call belongs to China Mobile, for example, the user selects a telecommunication provider (e.g., China Mobile) and a charge standard (e.g., 0.06 Yuan per second) corresponding to the telecommunication provider.

The communication fees calculating module 104 is operable to calculate a current communication fee of the current call according to the selected charge standard, and record the current communication fee into the storage device 12. Referring to FIG. 3B, when the user selects the charge standard for the current call, the communication fees calculating module 104 calculates the current communication fee (i.e., 12 Yuan) of the current call according to the selected charge standard, and displays the current communication fee on the charge standard selecting interface 122 of the display screen 13.

Figure 3C:
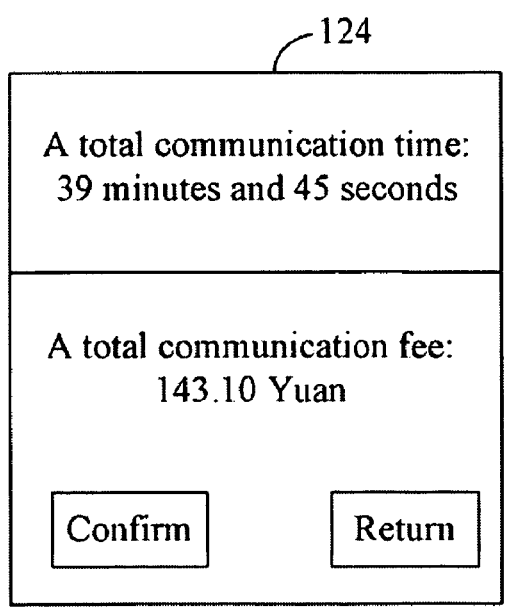

The communication fees calculating module 104 is further operable to generate the communication fees reporting interface 124 on the display screen 13, calculate a total communication time and a total communication fee according to all previous communication times and communication fees recorded in the storage device 12, and display the total communication time and the total communication fee on the communication fees reporting interface 124. Referring to FIG. 3C, when the user selects a confirmed selection of the communication fees reporting interface 124, the communication fees calculating module 104 calculates the total communication time (e.g., 39 minutes and 45 seconds) and the total communication fee (e.g., 143.10 Yuan), and displays the total communication time and the total communication fee on the communication fees reporting interface 124 of the display screen 13.

Figure 2:
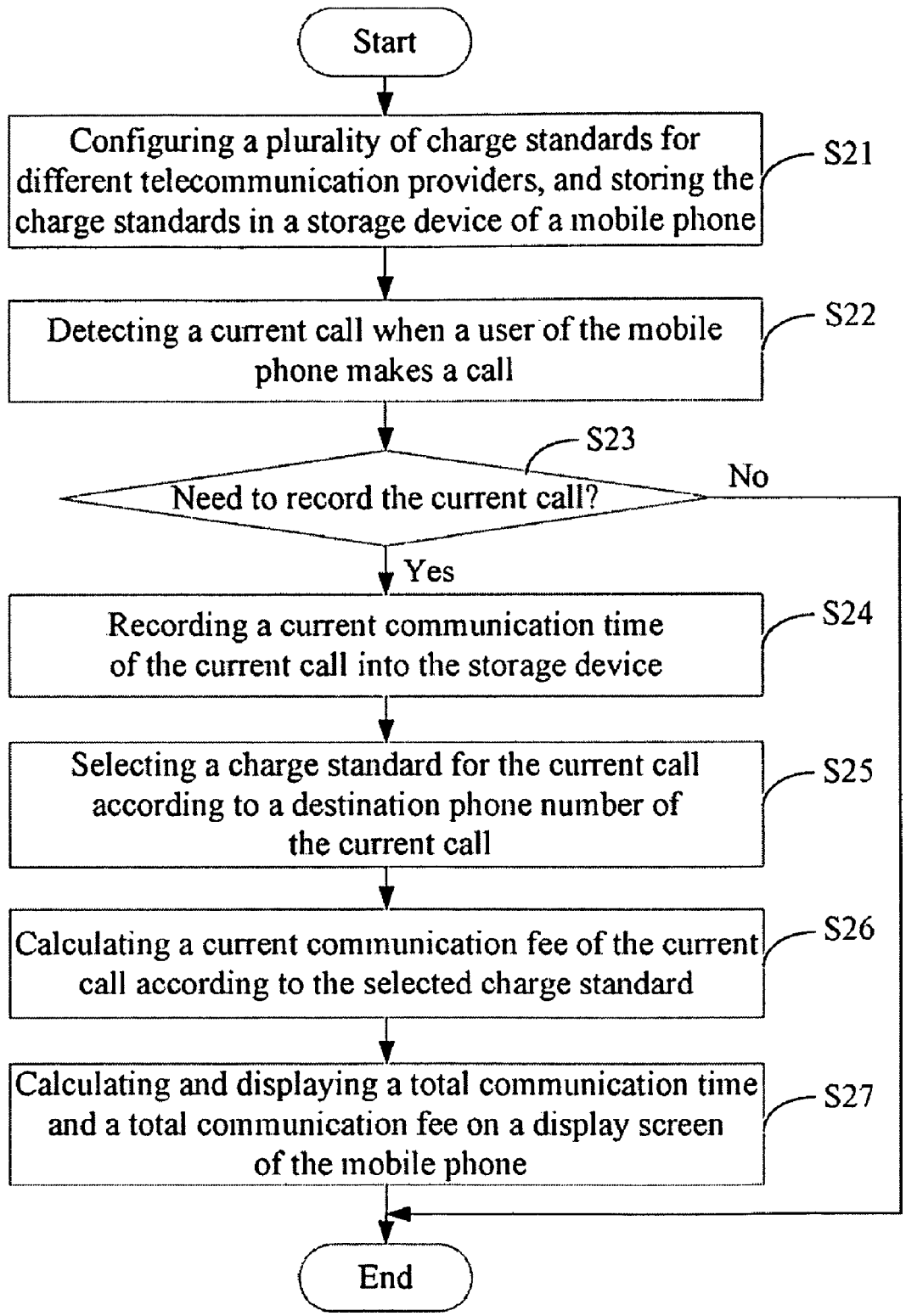
FIG. 2 is a flowchart of one embodiment of a method for managing communication fees of a mobile phone.

FIG. 2 is a flowchart of one embodiment of a method for managing communication fees of a mobile phone by using the system 10 of FIG. 1 as described above. Depending on the embodiment, additional blocks may be added, others removed, and the ordering of the blocks may be changed.

In block S21, the charge standard configuring module 101 configures a plurality of charge standards of different telecommunication providers, and stores the charge standards into the storage device 12. For example, a user of the mobile phone 1 can configure a charge rate as 0.06 Yuan per second according to the charge standard of China Mobile using the charge standard configuring module 101.

In block S22, the communication detecting module 102 detects a current call when the user of the mobile phone 1 makes a call, and generates a communication time reporting interface 120 on the display screen 13.

In block S23, the communication detecting module 102 determines whether the current call needs to be recorded according to an input selection from the communication time reporting interface 120. Referring to FIG. 3A, if the user selects a "Yes" selection in the communication time reporting interface 120, the communication detecting module 102 determines that the current call needs to be recorded, then records a current communication time (e.g., 3 minutes and 20 seconds) of the current call into the storage device 12. Otherwise, if the user selects a "No" selection in the communication time reporting interface 120, the communication detecting module 102 determines that the current call does not need to be recorded, the procedure ends directly.

In block S25, the charge standard selecting module 103 generates a charge standard selecting interface 122 on the display screen 13, and selects a charge standard for the current call according to a destination phone number of the current call. Referring to FIG. 3B, if the destination phone number of the current call belongs to China Mobile, for example, the user selects a telecommunication provider (e.g., China Mobile) and a charge standard (e.g., 0.06 Yuan per second) corresponding to the telecommunication provider.

In block S26, the communication fees calculating module 104 calculates a current communication fee of the current call according to the selected charge standard and the current communication time, and records the current communication fee into storage device 12. Referring to FIG. 3B, when the user selects the charge standard for the current call, the communication fees calculating module 104 calculates the current communication fee (i.e., 12 Yuan) of the current call according to the selected charge standard and the current communication time, and displays the current communication fee on the charge standard selecting interface 122 of the display screen 13.

In block S27, the communication fees calculating module 104 generates a communication fees reporting interface 124 on the display screen 13, calculates a total communication time and a total communication fee according to all previous communication times and communication fees recorded in the storage device 12, and displays the total communication time and the total communication fee on the communication fees reporting interface 124. Referring to FIG. 3C, when the user selects a confirmed selection of the communication fees reporting interface 124, the communication fees calculating module 104 calculates the total communication time (e.g., 39 minutes and 45 seconds) and the total communication fee (e.g., 143.10 Yuan), and displays the total communication time and the total communication fee on the communication fees reporting interface 124 of the display screen 13.

All of the processes described above may be embodied in, and fully automated via, functional code modules executed by one or more general purpose processors of electronic devices. The functional code modules may be stored in any type of readable medium or other storage devices. Some or all of the methods may alternatively be embodied in specialized the electronic devices.

Although certain inventive embodiments of the present disclosure have been specifically described, the present disclosure is not to be construed as being limited thereto. Various changes or modifications may be made to the present disclosure without departing from the scope and spirit of the present disclosure. For example, the above-described mobile phone 1 and communication fees management system 10 may be applied to other national or international telephone communication providers.

What is claimed is:

1. A mobile phone for managing communication fees, the mobile phone comprising:
   a storage device operable to store a plurality of charge standards of different telecommunication providers;
   a display screen operable to display a plurality of user interfaces; and
   at least one processor operable to execute a communication fees management system, comprising:
   a communication detecting module operable to detect a current call when a user of the mobile phone makes a call, generate a communication time reporting interface on the display screen, determine whether the current call needs to be recorded according to an input selection from the communication time reporting interface, and record a current communication time of the current call into the storage device;
   a charge standard selecting module operable to generate a charge standard selecting interface on the display screen, and select a charge standard for the current call from the storage device according to a destination phone number of the current call; and
   a communication fees calculating module operable to calculate a current communication fee of the current call according to the selected charge standard and the current communication time, record the current communication fee into the storage device, and display the current communication time and the current communication fee on the charge standard selecting interface of the display screen.

2. The mobile phone according to claim 1, wherein the communication fees management system further comprises a charge standard configuring module operable to configure the plurality of charge standards of the different telecommunication providers, and store the plurality of charge standards in the storage device.

3. The mobile phone according to claim 1, wherein the communication fees calculating module is further operable to generate a communication fees reporting interface on the display screen, calculate a total communication time and a total communication fee according to all previous communication times and communication fees recorded in the storage device, and display the total communication time and the total communication fee on the communication fees reporting interface.

4. The mobile phone according to claim 1, wherein each of the mobile telecommunication providers provides a communication service to the user of the mobile phone when the charge standard configuring module configures a charge standard of the mobile telecommunication provider.

5. The mobile phone according to claim 1, wherein each of the charge standards is reconfigured when the charge standard of a corresponding telecommunication provider changes.

6. The mobile phone according to claim 1, wherein the storage device is selected from the group consisting of a smart media card, a secure digital card, a compact flash card, a multi media card, and an extreme digital card.

7. A method for managing communication fees of a mobile phone, the method comprising:
   configuring a plurality of charge standards of different telecommunication providers in a storage device of the mobile phone;
   detecting a current call when a user of the mobile phone makes a call, and generating a communication time reporting interface on a display screen of the mobile phone;
   determining whether the current call needs to be recorded according to an input selection from the communication time reporting interface;
   recording a current communication time of the current call into the storage device if the current call needs to be recorded, or directly ending the procedure if the current call does not need to be recorded;
   generating a charge standard selecting interface on the display screen, and selecting a charge standard for the current call according to a destination phone number of the current call;
   calculating a current communication fee of the current call according to the selected charge standard and the current communication time, and recording the current communication fee in the storage device; and
   displaying the current communication time and the current communication fee on the charge standard selecting interface of the display screen.

8. The method according to claim 7, further comprising:
   generating a communication fees reporting interface on the display screen;
   calculating a total communication time and a total communication fee according to all previous communication times and communication fees recorded in the storage device; and
   displaying the total communication time and the total communication fee on the communication fees reporting interface.

9. The method according to claim 7, wherein each of the mobile telecommunication providers provides a communication service to the user of the mobile phone when a charge standard of the mobile telecommunication provider is stored in the storage device.

10. The method according to claim 7, wherein each of the charge standards is reconfigured when the charge standard of a corresponding telecommunication provider changes.

11. The method according to claim 7, wherein the storage device is selected from the group consisting of a smart media card, a secure digital card, a compact flash card, a multi media card, and an extreme digital card.

12. A non-transitory readable medium having stored thereon instructions that, when executed by a processor of a mobile phone, cause the mobile phone to perform a method for managing communication fees, the method comprising:
   configuring a plurality of charge standards of different telecommunication providers in a storage device of the mobile phone;
   detecting a current call when a user of the mobile phone makes a call, and generating a communication time reporting interface on a display screen of the mobile phone;
   determining whether the current call needs to be recorded according to a user's selection input from the communication time reporting interface;
   recording a current communication time of the current call into the storage device if the current call needs to be recorded, or ending the procedure directly if the current call does not need to be recorded;
   generating a charge standard selecting interface on the display screen, and selecting a charge standard for the current call according to a destination phone number of the current call;
   calculating a current communication fee of the current call according to the selected charge standard and the current communication time, and recording the current communication fee in the storage device; and
   displaying the current communication time and the current communication fee on the charge standard selecting interface of the display screen.

13. The medium according to claim 12, wherein the method further comprises:
   generating a communication fees reporting interface on the display screen;
   calculating a total communication time and a total communication fee according to all previous communication times and communication fees recorded in the storage device; and
   displaying the total communication time and the total communication fee on the communication fees reporting interface.

14. The medium according to claim 12, wherein each of the mobile telecommunication providers provides a communication service to the user of the mobile phone when a charge standard of the mobile telecommunication provider is stored in the storage device.

15. The medium according to claim 12, wherein each of the charge standards is reconfigured when the charge standard of a corresponding telecommunication provider changes.

16. The medium according to claim 12, wherein the storage device is selected from the group consisting of a smart media card, a secure digital card, a compact flash card, a multi media card, and an extreme digital card.

* * * * *